United States Patent [19]

Lopez

[11] Patent Number: 4,685,823
[45] Date of Patent: Aug. 11, 1987

[54] ANTIBACKLASH SHAFT COUPLING

[75] Inventor: Nephi E. Lopez, Seattle, Wash.

[73] Assignee: The Boeing Company, Seattle, Wash.

[21] Appl. No.: 219,424

[22] Filed: Dec. 23, 1980

[51] Int. Cl.$^4$ ............................................. F16D 1/02
[52] U.S. Cl. ..................................... 403/359; 29/558;
                                                 464/179; 403/290
[58] Field of Search ...................... 464/181, 180, 179;
                                       403/359, 290; 29/558; 74/594, 206

[56] References Cited

U.S. PATENT DOCUMENTS

| | | |
|---|---|---|
| 281,618 | 7/1883 | Crowell . |
| 1,490,649 | 4/1924 | Vanderbeek ......................... 403/359 |
| 2,297,390 | 9/1942 | Burger . |
| 2,441,624 | 5/1948 | Elliott . |
| 2,822,677 | 2/1958 | Reynolds . |
| 2,861,437 | 11/1958 | Bachman . |
| 2,885,232 | 5/1959 | Eberly . |
| 3,020,775 | 2/1962 | Musser . |
| 3,314,318 | 4/1967 | Shoults . |
| 3,335,580 | 8/1967 | Simpson, Jr. ...................... 403/359 |
| 3,399,549 | 9/1968 | Nagele . |
| 3,871,786 | 3/1975 | Rennerfelt . |
| 4,178,777 | 12/1979 | Ying et al. ......................... 403/359 |

Primary Examiner—Billy S. Taylor
Attorney, Agent, or Firm—Christensen, O'Connor, Johnson & Kindness

[57] ABSTRACT

An antibacklash splined shaft (14) is formed by first machining splines (22) in the end of the shaft, thereafter forming an axial bore (26) in the shaft, and thereafter forming slots (28) in the shaft that extend from between the spline into the bore. When the slots are formed, the teeth flex slightly outwardly to relieve the internal stresses in the shaft. Thus, when the splined shaft (14) is inserted into an internally splined member, the teeth are biased outwardly so as to firmly and intimately engage the internal splines, providing a coupling that exhibits no backlash.

3 Claims, 4 Drawing Figures

4,685,823

ANTIBACKLASH SHAFT COUPLING

BACKGROUND OF THE INVENTION

The present invention relates to splined rotary couplings and more particularly to splined shafts of the type utilized to couple a position-monitoring, variable rotary differential transformer (RVDT) to mechanical power drive units.

Electrical or hydraulic drive units are utilized to position the leading edge slats on commercial airplane wings. An electrical power drive unit, for example, is mechanically coupled to a rotary variable differential transformer (RVDT). The RVDT is rotated in reaction to motion of the power drive unit to provide an electrical output signal proportional to the actual position of the leading edge slat. As it is critical that the electrical output of the RVDT accurately indicates the precise position of the leading edge slat, it is absolutely necessary that no slippage or backlash occur in the mechanical connection between the power drive unit and the RVDT. It is especially important that no backlash occurs in the mechanical coupling between the follow-up mechanism and the RVDT.

It was therefore an object of the present invention to provide a positive direct drive between the shaft of an RVDT and a mechanism that follows the movement of moving parts such as the leading edge slat on an airplane wing. Further objects of the present invention were to provide a splined shaft that could easily be axially inserted and removed from, for example, a spur gear forming part of a follow-up mechanism, and to provide a splined shaft that would yield a zero backlash coupling merely upon insertion of the shaft into an internally splined gear member without further manipulation or adjustment of the shaft or external fasteners.

SUMMARY OF THE INVENTION

In accordance with the foregoing objects, and other objects that will become apparent to one of ordinary skill after reading the ensuing specification, the present invention provides an antibacklash shaft. The shaft has an end and longitudinally extending, external splines adjacent the end. An axial channel extends axially along the shaft and opens onto the end of the shaft. The shaft is divided into segments by slots that extend from the valleys formed between the spline teeth into the axial channel. Preferably these slots extend along shaft diameters and intersect each of the valleys between the spline teeth. The teeth are biased radially outwardly so that upon being inserted into mating splines, the teeth will intimately engage the internal splines to provide an antibacklash coupling.

BRIEF DESCRIPTION OF THE DRAWINGS

A better understanding of the present invention can be derived by reading the ensuing specification in conjunction with the accompanying drawings wherein.

DETAILED DESCRIPTION OF THE INVENTION

Figure 1:
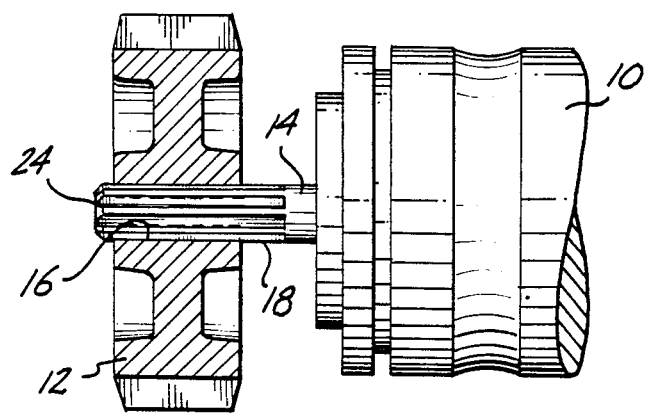
FIG. 1 is an elevation view in partial cross section of a spur gear forming part of the RVDT assembly, an RVDT, and an RVDT shaft constructed in accordance with the present invention.

Referring first to FIG. 1, a rotary variable differential transformer (RVDT) 10 is coupled to a spur gear 12 by a rotatable shaft 14. One end of the shaft 14 is internally fixed to the RVDT while the other end is removably coupled to the spur gear. As discussed above, the RVDT provides an electrical output signal dependent upon the rotational position of the shaft 14. The spur gear 12 forms part of the mechanical coupling between a power drive unit for moving, for example, a leading edge slat on a commercial airplane wing. As the leading edge slat is extended or retracted by the power drive unit, the spur gear rotates. The spur gear in turn rotates the shaft 14 to provide an output signal from the RVDT. The shaft 14 is keyed to the spur gear 12 by a plurality of internal, involute splines generally designated 16 on the spur gear 12 and external, involute splines generally designated 18 on the shaft 14. The internal, involute splines on the spur gear 12 are of conventional construction. It is the external splines 18 on the shaft 14 which provide the uique antibacklash characteristic of the present invention.

Figure 2:
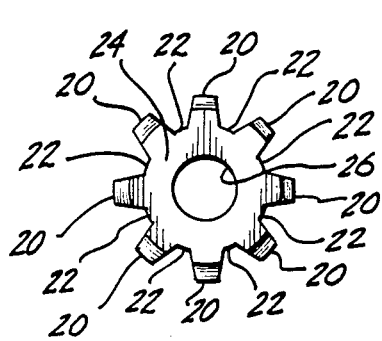
FIG. 2 is an end view of the shaft in an intermediate stage of manufacture.

A preferred embodiment of the splined shaft 14 will be described in additional detail in conjunction with FIGS. 2, 3, and 4. Referring first to FIGS. 2 and 4, spline teeth 20 are formed by machining longitudinally extending splines 22 into the surface of the shaft 14. The splines extend from the exposed end 24 of the shaft to a predetermined location spaced from the end of the shaft. The spline teeth 20 preferably extend on the order of one-third of a shaft radius into the shaft. In the preferred embodiment, eight equally circumferentially spaced splines 22 are machined so as to form eight equally sized teeth 20. Also in the preferred embodiment, the spline teeth 20 are geometrically involute in form.

Next, the outer peripheral edges of the teeth are chamfered at the end 24 of the shaft. In the preferred embodiment, the chamfer extends from the circumferential surface of the teeth to a location about a fifth of the way toward the center of the shaft. As will be better understood later, this chamfer provides a lead-in for easy insertion of the shaft into the internally splined portion of the spur gear 12.

An axial bore 26 is then formed in the shaft, preferably by drilling axially inwardly from the end 24 of the shaft 14. The axial bore 26 has a diameter about one-third the diameter of the original shaft. Although the bore diameter can vary as desired, it will become necessary to increase the relative diameter of the bore to the shaft as the shaft becomes larger. The bore 26 preferably extends into the shaft to a location preferably beyond the ends of the splines 22. If desired, the spline and bore forming steps can be reversed without affecting the present invention.

Figure 3:
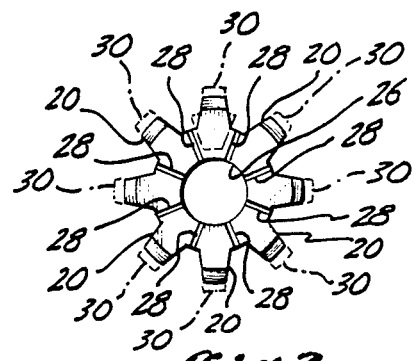
FIG. 3 is an end view of a completed shaft.
Figure 4:
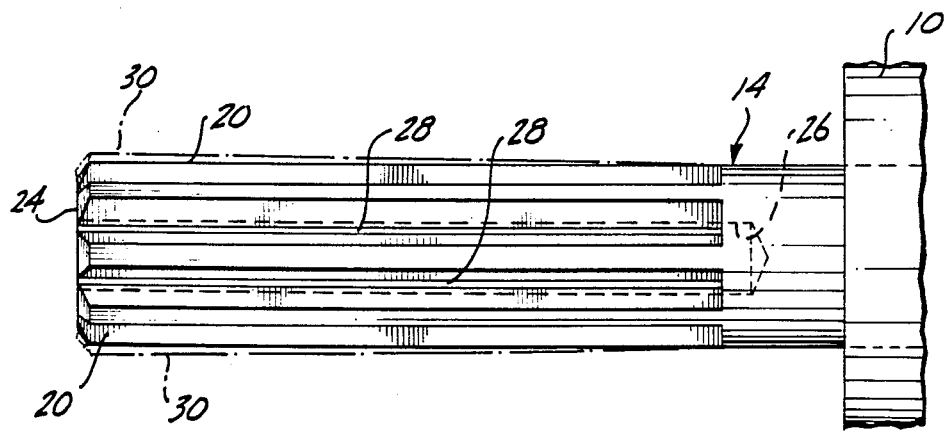
FIG. 4 is an enlarged elevation view of the shaft of the present invention showing the unique, radially outwardly biased teeth forming an integral part of the splined shaft.

Referring to FIGS. 3 and 4, in accordance with the present invention, the internal stresses within the shaft 14 are relieved by forming a plurality of diametrically oriented slots 28 that extend from the bottom of the splines 22 diametrically through the bore 26 and into a diametrically opposed spline 22. In the disclosed embodiment, there are eight splines; thus, four slots are formed joining diametrically opposed grooves. As these slots are formed, the stresses in the remaining material forming the spline teeth are relieved causing the teeth to spring slightly outwardly as indicated by the dot/dash lines 30 in both FIGS. 3 and 4. The radial outward movement of the teeth is most pronounced adjacent the end 24 of the shaft 14, because the end portions of the teeth are not restrained whereas the portions of the teeth adjacent the unslotted shaft are, of course, totally confined by the original shaft sructure.

It must be understood that the internal, involute splines formed in the spur gear 12 are machined with a matching geometrical configuration that is substantially equivalent to the original size of the shaft 14. If is preferred that the circular space width of the internal splines in the spur gear be full size or slightly greater than the circular tooth thickness of the external splines of the shaft 14, while the corresponding sides of the internal splines in the spur gear are inwardly divergent in configuration in a manner that is coincident with the sides of the splines 22 on the shaft when the teeth 20 are in their unsprung condition. In this manner, when the chamfered lead-in end of the shaft 14 is inserted into the internal splines of the spur gear 12, the outwardly biased teeth are forced inwardly and reside in virtually intimate contact with the internal splines in the spur gear 12. Because of the outward bias of the splined teeth 20, no backlash can occur when the rotational direction of the spur gear 12 is reversed relative to the shaft 14.

One of ordinary skill will readily see that the splined shaft of the present invention fulfills the objects set forth above. Particularly, the chamfered shaft end forms a lead-in so that the shaft may be inserted into an internally splined spur gear without precise prealignment. Additionally, the chamfered lead-in allows the shaft to be inserted into the internal spline blindly, that is, without being able to see the internally splined gear. Also, the unique construction of the splined shaft provides an outward spring bias on the teeth, thus locking them into the internal splines and yielding a coupling that exhibits virtually no backlash. Although one of ordinary skill will be able to effect various changes, substitutions of equivalents, and other alterations without departing from the board concepts disclosed herein, it is intended that the scope of protection granted by Letters Patent hereon be limited only by the definition contained in the appended claims and equivalents thereof.

The embodiments of the invention in which an exclusive property or privilege is claimed are defined as follows:

1. An antibacklash shaft comprising:
a shaft having an end and longitudinally extending, external, involute splines thereon, said shaft having an internal channel extending axially along the shaft and opening onto said end, said shaft being divided into longitudinally oriented, flexible segments by slots extending from the bottom of said spline into said channel, said segments being configured by the relief of internal stresses within said segments so that the outside diameter across said segments at said end of said shaft is greater than the outside diameter across said segments at a point located axially from said end of said shaft.

2. The shaft of claim 1 wherein the peripheral portion of said shaft adjacent said end is chamfered to form a lead-in.

3. The shaft of claim 1 wherein said internal channel comprises an axial bore.

* * * * *